United States Patent
Nishio

(10) Patent No.: US 9,089,014 B2
(45) Date of Patent: Jul. 21, 2015

(54) ILLUMINATION SYSTEM AND ILLUMINATION METHOD

(71) Applicant: OLYMPUS CORPORATION, Tokyo (JP)

(72) Inventor: Masahiro Nishio, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 122 days.

(21) Appl. No.: 13/851,498

(22) Filed: Mar. 27, 2013

(65) Prior Publication Data

US 2013/0207550 A1 Aug. 15, 2013

Related U.S. Application Data

(63) Continuation of application No. PCT/JP2011/070167, filed on Sep. 5, 2011.

(30) Foreign Application Priority Data

Sep. 30, 2010 (JP) ................................ 2010-222841

(51) Int. Cl.
- *A61B 1/06* (2006.01)
- *H05B 37/02* (2006.01)
- *G05D 25/02* (2006.01)
- *H05B 33/08* (2006.01)

(52) U.S. Cl.
CPC ............ *H05B 37/0209* (2013.01); *G05D 25/02* (2013.01); *H05B 33/089* (2013.01)

(58) Field of Classification Search
CPC .. A61B 1/0638; A61B 1/0653; A61B 1/0661; A61B 1/07; A61B 1/043; A61B 1/045; H01L 33/504; H01L 33/507; H05B 37/02; H05B 33/12

USPC ......... 600/178, 182, 192, 202, 223, 160, 476; 313/487, 501–503; 362/231, 293; 315/151, 307, 308, 224

See application file for complete search history.

(56) References Cited

U.S. PATENT DOCUMENTS

| | | | |
|---|---|---|---|
| 5,654,556 A | * | 8/1997 | Yasuda ......................... 250/584 |
| 7,679,277 B2 | * | 3/2010 | Morioka et al. .............. 313/486 |

(Continued)

FOREIGN PATENT DOCUMENTS

| | | |
|---|---|---|
| JP | 2005-328921 | 12/2005 |
| JP | 2008-26698 | 2/2008 |

(Continued)

OTHER PUBLICATIONS

International Search Report dated Nov. 29, 2011 issued in corresponding International Application No. PCT/JP2011/070167.

(Continued)

*Primary Examiner* — Haiss Philogene
(74) *Attorney, Agent, or Firm* — Scully, Scott, Murphy & Presser, P.C.

(57) ABSTRACT

An illumination system includes an excitation light source that emits excitation light, a phosphor unit that converts the excitation light emitted from the excitation light source into fluorescence to emit the fluorescence toward an illuminated object and a light source device including the excitation light source and the phosphor unit. The illumination system further includes a state confirming device that confirms a state of the light source device based on the state of the phosphor unit when connected to the light source device and the phosphor unit emits the fluorescence.

21 Claims, 6 Drawing Sheets

(56) References Cited

U.S. PATENT DOCUMENTS

| | | | |
|---|---|---|---|
| 8,062,549 B2 * | 11/2011 | Nagatomi et al. | 252/301.4 F |
| 8,337,400 B2 * | 12/2012 | Mizuyoshi | 600/178 |
| 2014/0140059 A1 * | 5/2014 | Tamura et al. | 362/231 |

FOREIGN PATENT DOCUMENTS

| | | |
|---|---|---|
| JP | 2010-5180 | 1/2010 |
| JP | 2010-61869 | 3/2010 |

OTHER PUBLICATIONS

Enclosed is a translation of the International Preliminary Report on Patentability together with the Written Opinion dated Apr. 18, 2013 received in related International Application No. PCT/JP2011/070167.

* cited by examiner

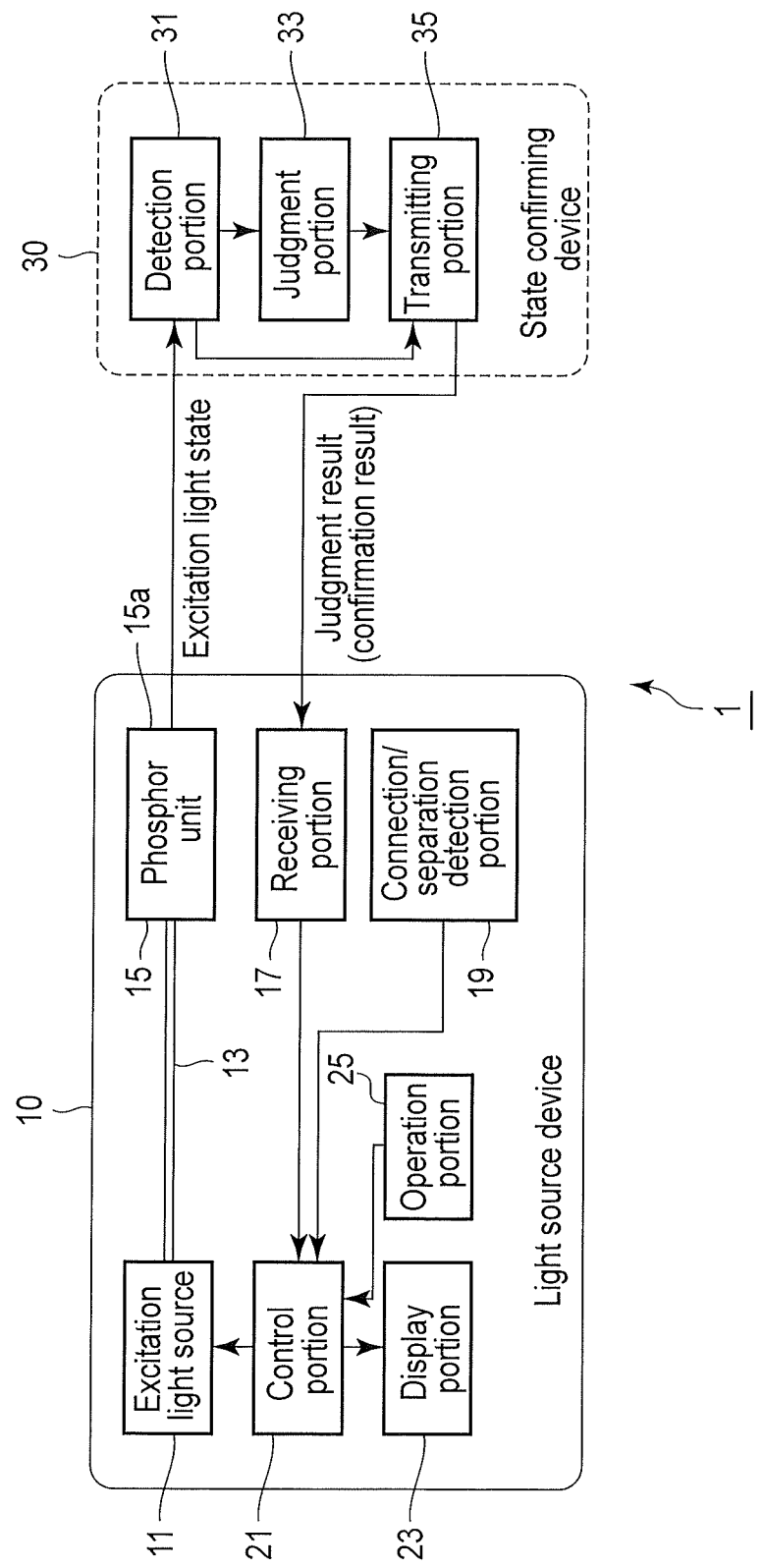
F I G. 1

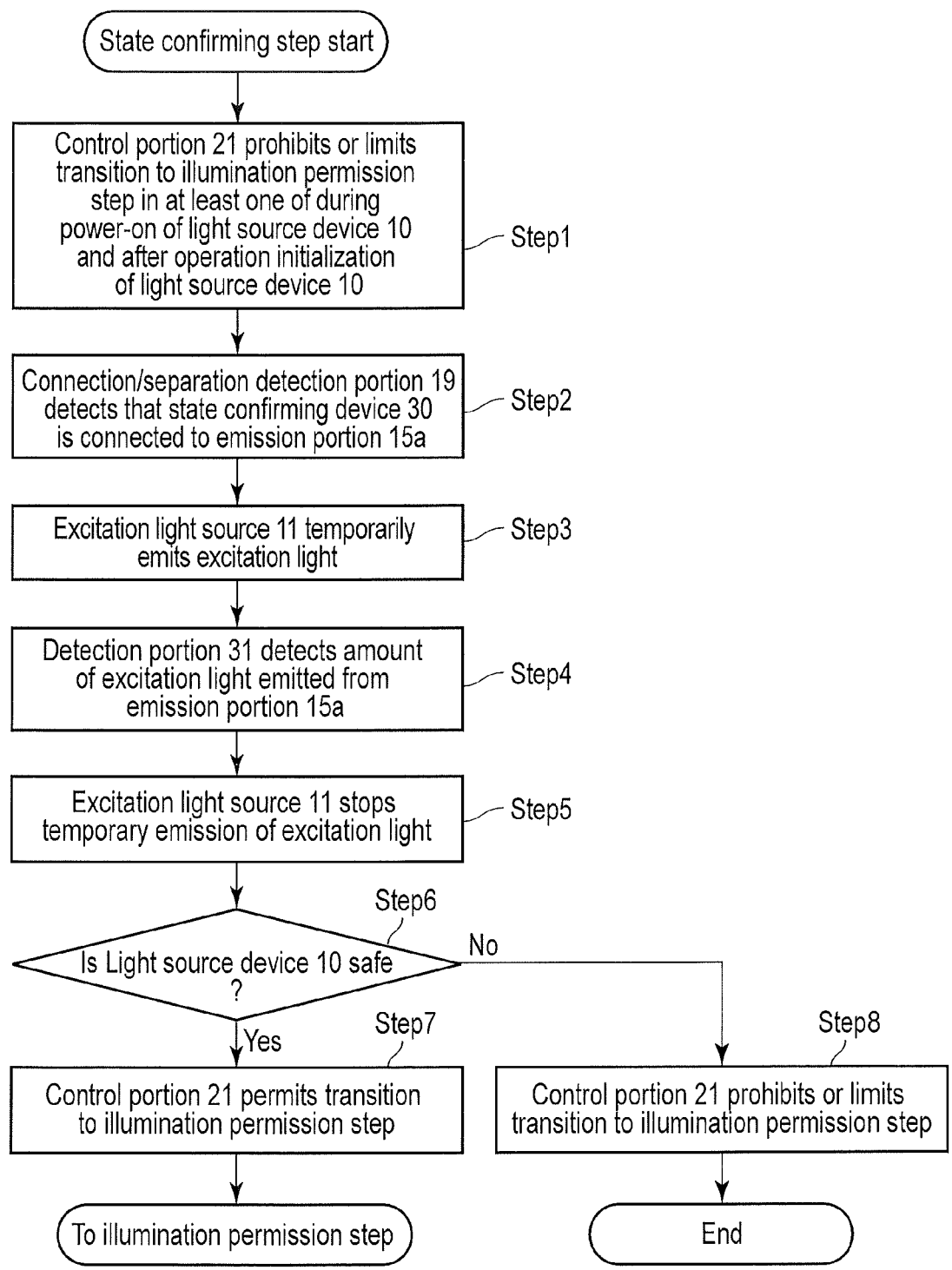
F I G. 3A

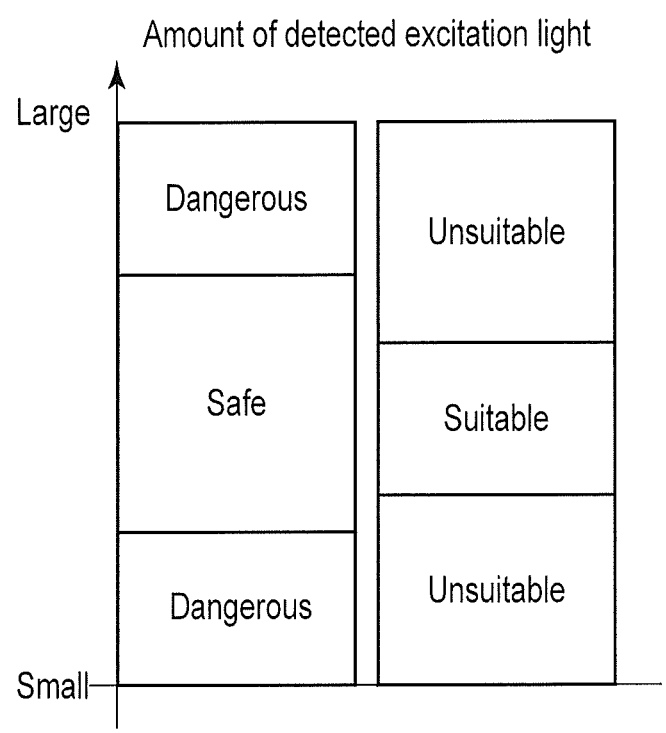
F I G. 4

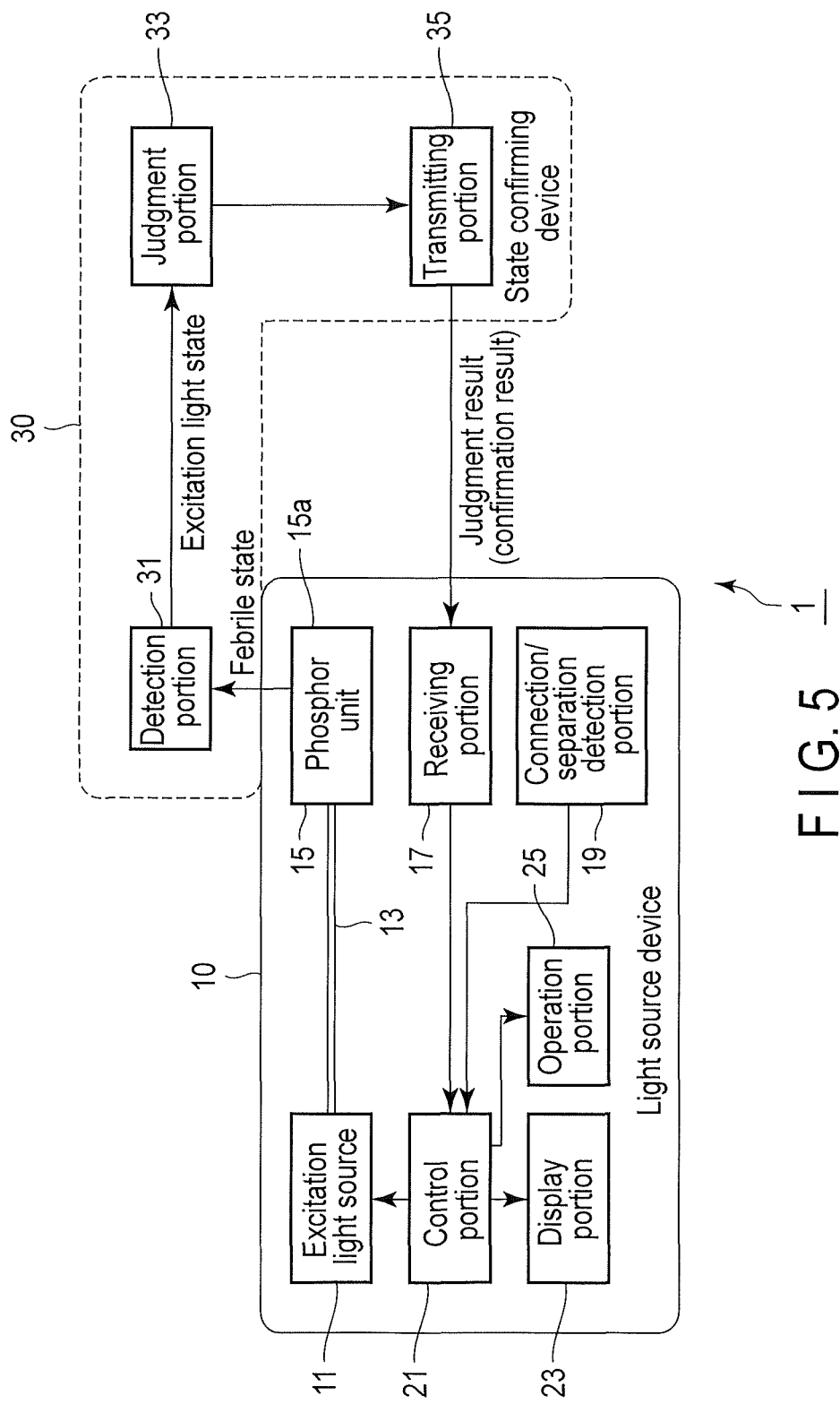
F I G. 5

US 9,089,014 B2

ILLUMINATION SYSTEM AND ILLUMINATION METHOD

CROSS REFERENCE TO RELATED APPLICATIONS

This application is a Continuation Application of PCT Application No. PCT/JP2011/070167, filed Sep. 5, 2011 and based upon and claiming the benefit of priority from prior Japanese Patent Application No. 2010-222841, filed Sep. 30, 2010, the entire contents of all of which are incorporated herein by reference.

BACKGROUND OF THE INVENTION

1. Field of the Invention

The present invention relates to an illumination system and an illumination method that illuminate an illuminated object.

2. Description of the Related Art

For example, Jpn. Pat. Appln. KOKAI Publication No. 2008-26698 discloses a luminescent device as a light source device having a configuration capable of detecting a broken wire with high accuracy. The light source device includes a light source, a lens, a connector, a light guiding member, and an optical component. The light source includes a semiconductor light-emitting device that emits light, for example, excitation light. The lens condenses light emitted from the semiconductor light-emitting device. The connector is a component where light is condensed by the lens. The light guiding member is connected to the connector. The optical component is arranged at a distal end of the light guiding member. The light guiding member also guides light condensed from the connector. The light guiding member has, for example, an optical fiber. Light is guided into the optical component by the light guiding member.

The light source device also includes an optical branching member disposed between the lens and connector to branch light (reflected light, return light) returning from the optical component and a photoreceptor that receives light branched by the optical branching member. The photoreceptor functions as a detector that detects abnormalities of the light source device, for example, a broken wire of a light guiding member by detecting light.

In Jpn. Pat. Appln. KOKAI Publication No. 2008-26698 described above, the optical branching member is arranged between the lens and connector and so blocks excitation light from the light source toward the optical component. Accordingly, losses of excitation light from the light source toward the optical component increase, leading to lower emission efficiency of the light source device.

In addition, detection items that can be detected by reflected light are limited, which decreases detection accuracy. To improve detection accuracy, it is necessary to increase the number of detection items. To increase the number of detection items, a plurality of detecting portion is needed. If the plurality of detecting portions is disposed, the light source device increases in size.

BRIEF SUMMARY OF THE INVENTION

The present invention is made in view of the above circumstances and an object thereof is to provide an illumination system and an illumination method capable of detecting abnormalities of a light source device without decreasing emission efficiency and without increasing the light source device in size.

According to an aspect of embodiments, an illumination system includes an excitation light source that emits excitation light, a phosphor unit that converts the excitation light emitted from the excitation light source into fluorescence to emit the fluorescence toward an illuminated object, a light source device including the excitation light source and the phosphor unit and a state confirming device that confirms a state of the light source device based on the state of the phosphor unit when connected to the light source device and the phosphor unit emits the fluorescence.

According to an aspect of embodiments, an illumination method having a light source device including an excitation light source that emits excitation light and a phosphor unit that converts the excitation light emitted from the excitation light source into fluorescence to emit the fluorescence toward an illuminated object including confirming a state of the light source device by a state confirming device based on the state of the phosphor unit when the state confirming device that confirms the state of the light source device is connected to the light source device and the phosphor unit emits the fluorescence (state confirming step) and illuminating the illuminated object with the fluorescence generated by the light source device based on the excitation light (illumination step).

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram of an illumination unit according to a first embodiment of the present invention.

FIG. 3A is a flow chart of a state confirming step according to the present embodiment.

FIG. 4 is a diagram to illustrate criteria for "safe" and "dangerous" and criteria for "suitable" and "unsuitable" in a modification of the first embodiment.

FIG. 5 is a schematic diagram of an illumination unit according to a second embodiment of the present invention.

DETAILED DESCRIPTION OF THE INVENTION

Figure 2:
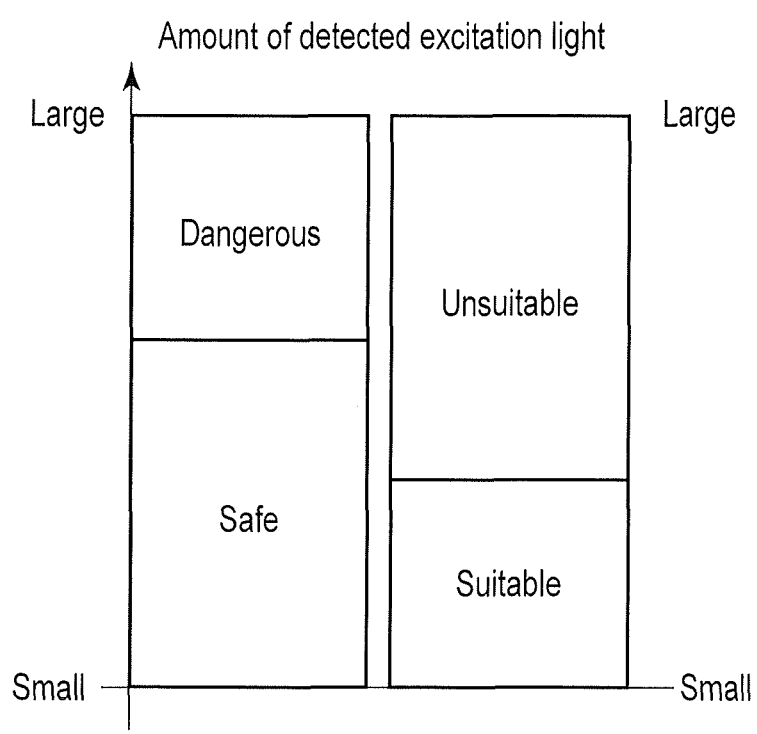
FIG. 2 is a diagram to illustrate criteria for "safe" and "dangerous" and criteria for "suitable" and "unsuitable".

The embodiments of the present invention will be described below in detail with reference to the drawings.

The first embodiment will be described with reference to FIGS. 1, 2, 3A, and 3B. An operation method in the present embodiment is executed in the order of the state confirming step, illumination permission step, and illumination step.

The state confirming step indicates that the state of a light source device 10 is confirmed by a state confirming device 30 described later.

The illumination permission step indicates preparation processing to proceed to the illumination step and also indicates processing to permit the execution of the illumination step when the state confirming device 30 confirms that the light source device 10 has no abnormal condition in the state confirming step.

The illumination step indicates that an excitation light source 11 emits excitation light so that the light source device 10 illuminates an illuminated object (not shown) when preparations are completed in the illumination permission step.

As shown in FIG. 1, an illumination system 1 includes the light source device 10 that illuminates an illuminated object with fluorescence generated based on excitation light and the state confirming device 30 that can be connected to or separated from the light source device 10. The state confirming device 30 confirms the state of the light source device 10, that is, whether the light source device 10 has any abnormal condition based on the state of emitted light from a phosphor unit 15 when connected to the light source device 10 and the phosphor unit 15 disposed in the light source device 10 emits fluorescence.

The light source device 10 includes the excitation light source 11 that emits excitation light, an optical fiber 13 as a light guiding member that guides excitation light emitted from the excitation light source 11, and the phosphor unit 15 that converts excitation light guided by the optical fiber 13 into, for example, fluorescence and emits the fluorescence toward an illuminated object to illuminate the illuminated object with the fluorescence.

Abnormal conditions of the light source device 10 described above include, for example, breaking of the optical fiber 13, leakage of excitation light due to breaking, lower emission efficiency of excitation light and lower emission efficiency of fluorescence caused by a failure of the phosphor unit 15, and a state in which excitation light increases uselessly. The judgment of whether the light source device 10 is abnormal will be described later.

The excitation light source 11 includes, for example, a laser device.

The phosphor unit 15 includes a phosphor (not shown). The phosphor converts excitation light into wavelength converted light having a wavelength different from the wavelength of the excitation light by the excitation light emitted from the optical fiber 13 being illuminated. That is, the phosphor is a wavelength conversion member that converts the wavelength of excitation light. The wavelength converted light is, for example, fluorescence. Thus, the phosphor unit 15 emits fluorescence as illumination light that illuminates an illuminated object.

Incidentally, a phosphor converts a part of excitation light into fluorescence, instead of converting all excitation light actually illuminated into fluorescence. Thus, the phosphor emits excitation light as well as fluorescence. The phosphor unit 15 includes an emission portion 15a that emits fluorescence and excitation light that is not converted into fluorescence by a phosphor. The emission portion 15a connects or separates the state confirming device 30. The emission portion 15a functions also as an emission portion of the light source device 10. The phosphor unit 15 needs only to include a phosphor. The light source device 10 further includes a receiving portion 17 that receives a confirmation result transmitted from the state confirming device 30 and described later and the like, a connection/separation detection portion 19 that detects that the state confirming device 30 is connected to or separated from the emission portion 15a, a control portion 21 that exercises various kinds of control in the light source device 10, a display portion 23 that displays various kinds of information, and an operation portion 25 that operates the light source device 10.

The control portion 21 controls the excitation light source 11 in the state confirming step so that the emission of excitation light is limited in at least one of during power-on of the light source device 10 and after operation initialization of the light source device 10.

In other words, the control portion 21 controls the light source device 10 (excitation light source 11) so that an illuminated object is not illuminated with illumination light after excitation light being emitted by the excitation light source 11 and as a result, fluorescence being emitted by the phosphor unit 15 during power-on or after operation initialization of the light source device 10 in which the receiving portion 17 has received no confirmation result. In this manner, the control portion 21 limits the operation of the light source device 10 during power-on or after operation initialization of the light source device 10. That is, the control portion 21 controls the light source device 10 so as to prohibit or limit the transition to the illumination permission step during power-on or after operation initialization of the light source device 10.

The control portion 21 also controls the excitation light source 11 in the state confirming step so that the excitation light source 11 temporarily emits excitation light when the connection/separation detection portion 19 detects that the state confirming device 30 is connected to the emission portion 15a.

While the connection/separation detection portion 19 does not detect that the state confirming device 30 is connected to the emission portion 15a, the control portion 21 continues to prohibit the transition to the illumination permission step in operation. That the connection/separation detection portion 19 does not detect that the state confirming device 30 is connected to the emission portion 15a indicates that the connection/separation detection portion 19 that the state confirming device 30 is separated from the emission portion 15a.

The control portion 21 also executes the illumination permission step so that the excitation light source 11 emits excitation light and the light source device 10 executes the illumination step that illuminates an illuminated object when it is confirmed that the light source device 10 has no abnormal condition based on a confirmation result of the state confirming device 30 in the state confirming step.

In this manner, the control portion 21 controls the light source device 10 in the illumination permission step so as to permit the transition to the illumination step based on a confirmation result of the state confirming device 30 in the state confirming step.

The control portion 21 also controls the excitation light source 11 in the illumination permission step so as to enable the excitation light source 11 to emit excitation light when the connection/separation detection portion 19 detects that the state confirming device 30 is separated from the emission portion 15a.

The display portion 23 displays, for example, a state in which the state confirming device 30 is connected to the light source device 10. The display portion 23 also displays a message of the transition to the illumination permission step in the state confirming step, a message of the prohibition or limitation of the transition to the illumination permission step in the state confirming step, and whether there is any abnormal condition. The display portion 23 also displays a message of being able to proceed to the illumination step in the illumination permission step. The display portion 23 also displays a message to prompt the user to connect/separate the state confirming device 30 to/from the light source device 10.

The operation portion 25 receives an instruction to execute the illumination step in the illumination permission step after the connection/separation detection portion 19 detects that the state confirming device 30 is separated from the emission portion 15a. Accordingly, the control portion 21 executes the illumination step after the operation portion 25 being operated by the user.

The state confirming device 30 is freely removable from the emission portion 15a. The state confirming device 30 includes a detection portion 31 that detects the state of the light source device 10 based on the state of emitted light from the phosphor unit 15 when the connection/separation detection portion 19 detects that the state confirming device 30 is connected to the emission portion 15a and the control portion 21 controls the excitation light source 11 so that the excitation light source 11 temporarily emits excitation light. The state confirming device 30 further includes a judgment portion 33 that judges the state of the light source device 10, that is, whether the light source device 10 has any abnormal condition based on a detection result of the detection portion 31. The state confirming device 30 further includes a transmitting portion 35 that transmits a judgment result of the judgment portion 33 to the receiving portion 17.

A filter (not shown) that allows excitation light to path through is disposed in the detection portion 31. Thus, when the state confirming device 30 is connected to the emission portion 15a and the excitation light source 11 emits excitation light, the detection portion 31 detects the state of the light source device 10 in a state in which the phosphor unit 15 emits fluorescence and excitation light. The state of the light source device 10 is a state of excitation light emitted from the emission portion 15a. At this point, the detection portion 31 detects, for example, at least one of the amount of light, spectrum, and luminous intensity distribution characteristics of excitation light.

The detection portion 31 has, for example, an optical sensor when detecting the amount of excitation light. Also, the detection portion 31 has, for example, a spectroscope when detecting the spectrum or color of excitation light. Also, the detection portion 31 has, for example, a two-dimensional optical sensor array when detecting luminous intensity distribution characteristics of excitation light. At this point, the judgment portion 33 judges whether the state of excitation light such as the amount of light, spectrum, and luminous intensity distribution characteristics is a desired state to judge the state of the light source device 10. In the present embodiment, the detection portion 31 detects, for example, the amount of excitation light.

When the state of excitation light is detected, the detection portion 31 transmits detection information indicating detection to the control portion 21 via the transmitting portion 35 and the receiving portion 17. At this point, after receiving the detection information, as described above, the control portion 21 controls the excitation light source 11 temporarily emitting excitation light so that the excitation light source 11 stops the emission of excitation light.

The detection portion 31 also transmits the detected amount of excitation light as a detection result to the judgment portion 33.

In the state confirming step, the judgment portion 33 judges, for example, whether the amount of excitation light is equal to a predetermined value or more based on a detection result of the detection portion 31. Accordingly, the judgment portion 33 judges whether the state of the light source device 10 is "safe" or "dangerous" and further judges whether the state of the light source device 10 is "suitable" or "unsuitable". By making these judgments, the judgment portion 33 judges whether the light source device 10 has any abnormal condition. The judgment result of the judgment portion 33 indicates a confirmation result of the state confirming device 30 and is transmitted to the receiving portion 17 by the transmitting portion 35. The judgment result is transmitted to the control portion 21 via the receiving portion 17. After receiving a detection result by handling the detection result as detection information, as described above, the control portion 21 may control the excitation light source 11 temporarily emitting excitation light so that the excitation light source 11 stops the emission of excitation light.

Next, the presence or absence of any abnormal condition of the light source device 10, more specifically, being "safe" or "dangerous" judged by the judgment portion 33 will be described.

The judgment is made in the state confirming step.

If the excitation light source 11 includes, for example, as described above, a laser device, when an abnormal condition occurs in the light source device 10, there arises a possibility that excitation light as laser light equal to a predetermined value or more is emitted from an emission port. When an abnormal condition occurs in the light source device 10, the user is affected and there arises a possibility that the desired safety cannot be ensured. If excitation light equal to a predetermined value or more is emitted, there arises a possibility that other devices are affected. The judgment portion 33 judges such a state to be abnormal, that is, "dangerous".

When emitted excitation light is less than a predetermined value, the judgment portion 33 judges such a state to be abnormality-free (normal), that is, "safe".

The predetermined value as a threshold of judgment may be determined based on, for example, the amount of emitted light when the excitation light begins to affect other devices or the user of the light source device 10 by determining the amount of light detected by the detection portion 31 when such an amount of light is emitted as a criterion. Incidentally, the laser safety class defined by, for example, an international standard may be used as the threshold of judgment.

The method of judging to be "safe" and "dangerous" by the judgment portion 33 in the present embodiment will briefly be described below.

The control portion 21 controls the excitation light source 11, the excitation light source 11 emits excitation light, and the detection portion 31 detects the excitation light. The judgment portion 33 judges, for example, whether the amount of excitation light is equal to a predetermined value or more based on a detection result of the detection portion 31.

The above-mentioned case when an abnormal condition of the light source device 10 arises indicates that, for example, the phosphor unit 15 has failed. When the phosphor unit 15 fails, excitation light converted into fluorescence by the phosphor unit 15 decreases and excitation light emitted from the emission portion 15a without being converted increases. Thus, when the phosphor unit 15 fails, the amount of emitted fluorescence decreases and the amount of emitted excitation light increases.

Accordingly, the amount of excitation light detected by the detection portion 31 increases compared with a case when the phosphor unit 15 is not faulty. Therefore, the amount of excitation light detected by the detection portion 31 becomes, as shown in FIG. 2, a predetermined value or more. In this state, there is a possibility that excitation light affects the user or other devices. Thus, when the amount of excitation light becomes a predetermined value or more, the judgment portion 33 judges that the light source device 10 is abnormal, that is, "dangerous".

When the phosphor unit 15 is not faulty, the amount of excitation light detected by the detection portion 31 becomes, as shown in FIG. 2, less than a predetermined value. Thus, even if excitation light is emitted, the excitation light does not affect other devices or the user of the light source device 10. Thus, when the amount of excitation light becomes less than a predetermined value, the judgment portion 33 judges that the light source device 10 is abnormality-free, that is, "safe".

Next, the presence or absence of any abnormal condition of the light source device 10, more specifically, being "suitable" and "unsuitable" judged by the judgment portion 33 will be described.

The judgment is made in the state confirming step.

That the light source device 10 is "suitable" or the light source device 10 is "unsuitable" is determined by, for example, whether the excitation light source 11 or the phosphor unit 15 can satisfy design specifications.

The predetermined value as a threshold of judgment may be determined by considering manufacturing variations of, for example, the excitation light source 11 or the phosphor unit 15 in such a way that, for example, the excitation light source 11 or the phosphor unit 15 satisfies the design specifications. The predetermined value is smaller (lower) than the predetermined value when determining to be "safe" or "dangerous".

That the light source device 10 is "suitable" or the light source device 10 is "unsuitable" may also be determined in such a way that in consideration of degradation of, for example, the phosphor unit 15, the light source device 10 is determined to be "suitable" if there is sufficient time before the phosphor unit 15 becomes dangerous due to degradation of the phosphor unit 15 and determined to be "unsuitable" if there is not sufficient time.

If the judgment result of the judgment portion 33 is "safe" or "suitable", the control portion 21 permits the transition from the state confirming step to the illumination permission step. If the judgment result of the judgment portion 33 is "dangerous" or "unsuitable", the control portion 21 prohibits or limits the transition from the state confirming step to the illumination permission step. The excitation light source 11 prohibits or limits the operation thereof.

Figure 3B:
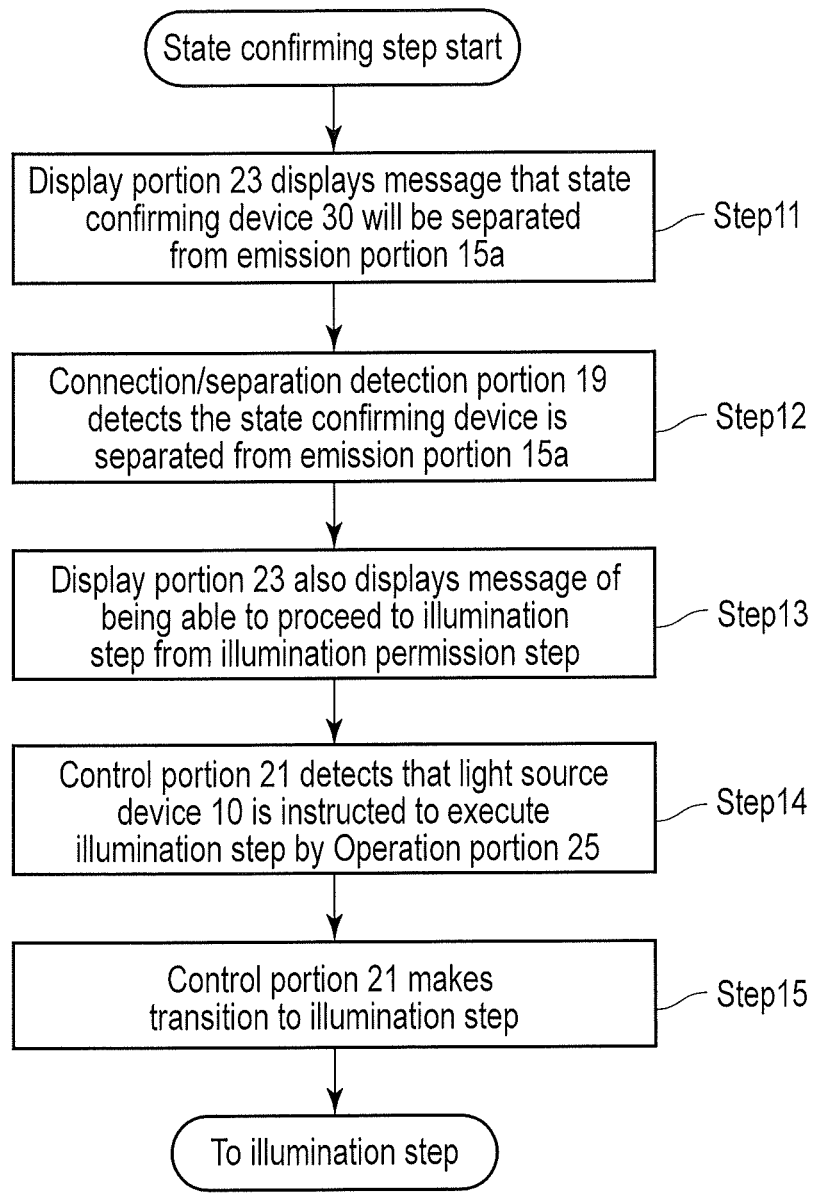
FIG. 3B is a flow chart of an illumination permission step according to the present embodiment.

Next, the operation method in the present embodiment will be described with reference to FIGS. 3A and 3B. First, the state confirming step will be described with reference to FIG. 3A.

The control portion 21 prohibits or limits the transition to the illumination permission step in at least one of during power-on of the light source device 10 and after operation initialization of the light source device 10 (Step 1).

After the state confirming device 30 is connected to the emission portion 15a, the connection/separation detection portion 19 detects that the state confirming device 30 is connected to the light source device 10 (emission portion 15a) (Step 2: Connection detection step). The display portion 23 displays that the state confirming device 30 is connected to the light source device 10.

Prior to Step 2, the display portion 23 may display a message to prompt the user to connect the state confirming device 30 to the emission portion 15a.

The control portion 21 controls the excitation light source 11 so that the excitation light source 11 temporarily emits excitation light when the connection/separation detection portion 19 detects that the state confirming device 30 is connected to the emission portion 15a in Step 2 (Step 3: Light source control step). Accordingly, the excitation light source 11 temporarily emits excitation light. Excitation light is guided by the optical fiber 13 and converted into fluorescence by the phosphor unit 15 before being emitted from the emission portion 15a as fluorescence. Incidentally, a part of excitation light is emitted from the emission portion 15a without being converted into fluorescence by the phosphor unit 15.

The detection portion 31 detects the amount of excitation light emitted from the emission portion 15a (Step 4: Detection step). The detection portion 31 also transmits detection information to the transmitting portion 35.

The transmitting portion 35 transmits detection information to the receiving portion 17 and the receiving portion 17 transmits the received detection information to the control portion 21.

After receiving the detection information, the control portion 21 controls the excitation light source 11 temporarily emitting excitation light so that the excitation light source 11 stops the emission of excitation light. Accordingly, the excitation light source 11 stops temporary emission of excitation light (Step 5).

At this point, the judgment portion 33 judges whether, for example, the amount of excitation light is equal to a predetermined value or more based on the amount of excitation light as a detection result detected by the detection portion 31 in Step 4 as the detection step. Accordingly, the judgment portion 33 judges whether the light source device 10 has any abnormal condition, that is, the light source device 10 is, for example, "safe" or "dangerous" (Step 6: Judgment step).

If the amount of excitation light is judged to be less than a predetermined value (Step 6: Yes), the judgment portion 33 judges that the light source device 10 is abnormality-free, that is, "safe".

The transmitting portion 35 transmits the judgment result to the receiving portion 17 and the control portion 21 permits the transition to the illumination permission step based on the judgment result, that is, a confirmation result of the state confirming device 30 (judgment result of the judgment portion 33). Then, the display portion 23 displays a message of the transition to the illumination permission step (Step 7).

If the amount of excitation light is judged to be equal to a predetermined value or more (Step 6: No), the judgment portion 33 judges that the light source device 10 is abnormal, that is, "dangerous".

The transmitting portion 35 transmits the judgment result to the receiving portion 17 and the control portion 21 prohibits or limits the transition to the illumination permission step based on the judgment result (Step 8). The display portion 23 may display a message of prohibiting or limiting the transition to the illumination permission step.

In the state confirming step, therefore, the state confirming device 30 is connected to the light source device 10 (Step 2) and when the phosphor unit 15 emits fluorescence (Step 3), the state confirming device 30 confirms the state of the light source device 10 based on the state of the emitted light of the phosphor unit 15 (Steps 4, 6). Incidentally, Step 5 may be executed after Step 6.

Next, the illumination permission step will be described with reference to FIG. 3B.

The display portion 23 displays a message that the state confirming device 30 will be separated from the emission portion 15a (Step 11). The display portion 23 may also display that the light source device 10 is safe.

After the state confirming device 30 is separated from the emission portion 15a, the connection/separation detection portion 19 detects that the state confirming device 30 is separated from the emission portion 15a (Step 12: Separation detection step).

The display portion 23 displays a message of being able to proceed to the illumination step from the illumination permission step (Step 13, Display step).

Next, the execution of the illumination step is accepted (and the light source device 10 waits for an operation of the operation portion 25 by the user) and after the operation is performed, the transition to the illumination step is made. The control portion 21 detects that the light source device 10 is instructed to execute the illumination step by the operation portion 25 (Step 14: Instruction step).

Then, the control portion 21 makes the transition to the illumination step (Step 15).

Therefore, the illumination permission step is executed if judged to be "safe" in the state confirming step (Steps 6, 7) and after the separation of the state confirming device 30 being confirmed (Step 12), the light source device 10 is permitted to illuminate an illuminated object (Steps 13, 14, 15).

In the illumination permission step and state confirming step, as described above, the excitation light source 11 is controlled so that the emission of excitation light is limited in at least one of power-on of the light source device 10 and operation initialization of the light source device 10 (Step 1) and if the light source device 10 has no abnormal condition based on a confirmation result in the state confirming step (Step 6: Yes), the excitation light source 11 is permitted to emit excitation light by permitting the execution of the illumination step (Step 13). That is, the light source device 10 is permitted to illuminate an illuminated object.

Next, the illumination step will be described.

In the illumination step, the excitation light source 11 emits excitation light, the optical fiber 13 guides the excitation light, and the phosphor unit 15 converts the guided excitation light into fluorescence to illuminate an illuminated object with the fluorescence as illumination light. In the illumination step, the light source device 10 illuminates an illuminated object as described above.

Thus, in the present embodiment, whether the light source device 10 has any abnormal condition can be confirmed based on excitation light by the excitation light being received by the state confirming device 30 when the state confirming device 30 is connected to the emission portion 15a. Also in the present embodiment, the state confirming device 30 needs only to be connected to the emission portion 15a and there is no need to arrange the state confirming device 30 inside the light source device 10. Accordingly, in the present embodiment, the state confirming device 30 does not block excitation light from the excitation light source 11 toward the phosphor unit 15 so that the degradation of emission efficiency of the light source device 10 can be prevented. Also in the present embodiment, an increased size of the light source device 10 can be prevented.

In the present embodiment, in Step 1, the emission of excitation light is limited by the control portion 21 in at least one of during power-on of the light source device 10 and after operation initialization of the light source device 10. Accordingly, in the present embodiment, the emission of excitation light can be prevented even if the light source device 10 is turned on in an abnormal condition of the light source device 10 so that safety thereof can be ensured. Also in the present embodiment, the emission of excitation light can be prevented in the initial operation of the light source device 10 so that safety thereof can be ensured.

Also in the present embodiment, if the judgment portion 33 judges in Step 6 that the light source device 10 has no abnormal condition based on a confirmation result of the state confirming device 30 in the state confirming step, in Step 7, the control portion 21 permits the excitation light source 11 to emit excitation light and the light source device 10 to illuminate an illuminated object. Thus, in the present embodiment, the emission of excitation light in an abnormal condition of the light source device 10 can be prevented by the emission of excitation light being limited.

Also in the present embodiment, the state confirming device 30 can be prevented from blocking excitation light inside the light source device 10, losses of excitation light can be suppressed, and the degradation of emission efficiency of the light source device 10 can be prevented by the state confirming device 30 being connected to the emission portion 15a. Also in the present embodiment, the excitation light source 11 can temporarily emit excitation light by being controlled by the control portion 21 in Step 3 after the connection of the state confirming device 30 to the emission portion 15a being detected by the connection/separation detection portion 19 in Step 2 and the presence or absence of an abnormal condition of the light source device 10 can thereby be detected by the state confirming device 30.

Also in the present embodiment, the state confirming device 30 needs only to be connected to the emission portion 15a to detect and judge whether the light source device 10 is abnormal and thus, there is no need to add a new element for detection and judgment to the light source device 10 and the output of the light source device 10 is not affected. Also in the present embodiment, the state confirming device 30 is separated from the emission portion 15a when the light source device 10 operates in the illumination step and thus, the state confirming device 30 does not affect the operation or use of the light source device 10.

Also in the present embodiment, the presence or absence of an abnormal condition of the light source device 10 can be detected and an abnormal condition can be judges by the detection portion 31 and the judgment portion 33 respectively.

Also in the present embodiment, the emission of excitation light can be prevented while the light source device 10 having an abnormal condition by executing the state confirming step before the illumination step so that safety thereof can be ensured.

Also in the present embodiment, the state confirming device 30 can be prevented from blocking illumination light emitted from the emission portion 15a by excitation light being emitted by the excitation light source 11 when the state confirming device 30 is separated from the emission portion 15a.

Also in the present embodiment, the transition to the illumination step can easily be discriminated by the executability of the illumination step being displayed (Step 13) by the display portion 23 after the separation detection step (Step 12).

Also in the present embodiment, the presence or absence of an abnormal condition of the light source device 10 can easily be judged by detecting at least one of the amount of light, spectrum, and luminous intensity distribution characteristics of excitation light emitted from the emission portion 15a in a state in which the phosphor unit 15 emits fluorescence.

Incidentally, the detection portion 31 in the present embodiment may also serve as the judgment portion 33. Also, the control portion 21 in the present embodiment may also serve as the judgment portion 33.

In the present embodiment, the judgment portion 33 judges whether the light source device 10 is "safe" or "dangerous" in Step 6, but there is no need to limit to the above example and, as described above, whether the light source device 10 is "suitable" or "unsuitable" may be judged. If the judgment result of the judgment portion 33 is "suitable" (Step 6: Yes), the control portion 21 enables the excitation light source 11 to operate by permitting the transition to the illumination permission step. If the judgment result of the judgment portion 33 is "unsuitable" (Step 6: No), the control portion 21 prohibits or limits the operation of the excitation light source 11 by prohibiting or limiting the transition to the illumination permission step.

Incidentally, the judgment portion 33 may judge to be "safe" or "dangerous" and at the same time, judge to be "suitable" or "unsuitable". Thus, in the present embodiment, the presence or absence of an abnormal condition of the light source device 10, that is, the state of the light source device 10 can be confirmed with high precision by at least one of safety of the light source device 10 and the state suitable for operation of the light source device 10 being judged by the judgment portion 33.

In the present embodiment, being less than a threshold is determined to be safe, but being within a predetermined range may be determined to be safe so that deviating from the range is determined to be dangerous.

If, for example, the optical fiber 13 is broken or degraded, excitation light leaks from a broken portion or degraded portion, the amount of excitation light entering the phosphor unit 15 decreases, and the amount of excitation light passing through the phosphor unit 15 also decreases.

When the phosphor unit 15 fails, as described in the present embodiment, the amount of excitation light passing through the phosphor unit 15 increases.

Thus, in the state confirming step, the judgment portion 33 judges to be "safe" if the amount of excitation light detected by the detection portion 31 falls within a predetermined range and judges to be "dangerous" if the amount of excitation light deviates from the range. By making these judgments, the judgment portion 33 judges whether the light source device 10 has any abnormal condition (see FIG. 4).

In the foregoing, the judgment portion 33 judges whether the light source device 10 is "safe" or "dangerous", but there is no need to limit to the above example and, as described above, whether the light source device 10 is "suitable" or "unsuitable" may be judged (see FIG. 4). The judgment to be "suitable" or "unsuitable" is as described above.

Next, a second embodiment of the present invention will be described with reference to FIG. 5. A duplicate description is omitted by attaching the same reference numerals to the same structural elements as those in the first embodiment.

A detection portion 31 in the present embodiment detects a thermal state of an emission portion 15a, more specifically, at least one of the temperature of the emission portion 15a and the calorific value of the emission portion 15a in a state in which a phosphor unit 15 emits fluorescence when a state confirming device 30 is connected to the emission portion 15a and an excitation light source 11 emits excitation light.

In general, the phosphor unit 15 generates heat when converting excitation light into fluorescence. Accordingly, the temperature of the emission portion 15a rises. The detection portion 31 detects at least one of the temperature and calorific value at this point.

Next, the presence or absence of any abnormal condition of a light source device 10, more specifically, being "safe" or "dangerous" judged by a judgment portion 33 will be described.

When the phosphor unit 15 fails like, for example, the degradation of the phosphor, the transmittance when excitation light passes through the phosphor unit 15 declines and the amount of excitation light absorbed by the phosphor unit 15 increases. According, when compared with a normal state in which, for example, the phosphor is not degraded, that is, the phosphor unit 15 is not faulty, the calorific value increases. Thus, the temperature of the emission portion 15a rises.

As a state in which the phosphor unit 15 is faulty, the phosphor falls from the light source device 10 or the optical axis of an optical fiber 13 and a state in which excitation light is not incident on the phosphor is entered, decreasing the amount of excitation light absorbed by the phosphor unit 15. According, when compared with a normal state in which, for example, the phosphor is not fallen from the light source device 10, that is, the phosphor unit 15 is not faulty, the calorific value decreases and the temperature of the emission portion 15a falls.

The judgment portion 33 judges whether the temperature of the emission portion 15a detected by the detection portion 31 falls within a predetermined range. The predetermined range is determined based on an influence on the user and other devices. The predetermined range may also be determined from values assumed when the light source device 10 is designed or from, for example, an international standard.

If the temperature of the emission portion 15a does not fall within the predetermined range, the judgment portion 33 judges the light source device 10 to be "dangerous". If the temperature of the emission portion 15a falls within the predetermined range, the judgment portion 33 judges the light source device 10 to be "safe".

Next, the detection of the calorific value in the emission portion 15a of a radiant unit by the detection portion 31 from temperature changes of the emission portion 15a will be described.

More specifically, the detection portion 31 detects the calorific value based on a relationship between the time between temporary emission of excitation light from the excitation light source 11 in Step 3 and the detection of the calorific value by the detection portion 31 in Step 4 and temperature changes in the time. In this case, the detection portion 31 calculates the calorific value by using the heat capacity of a member near the emission portion 15a of the phosphor unit 15.

The judgment portion 33 judges whether the calorific value of the emission portion 15a detected by the detection portion 31 falls within a predetermined range. The predetermined range is determined, like the case when judged by using the temperature, based on an influence on the user and other devices. The predetermined range may also be determined from values assumed when the light source device 10 is designed or from, for example, an international standard.

If the calorific value does not fall within the predetermined range, the judgment portion 33 judges the light source device 10 to be "dangerous". If the calorific value falls within the predetermined range, the judgment portion 33 judges the light source device 10 to be "safe".

In the foregoing, the temperature and calorific value are determined based on the influence on the user and other devices, there is no need to limit to such an example.

As a state in which the phosphor unit 15 is faulty, the phosphor falls from the light source device 10 or the optical axis of the optical fiber 13 and a state in which excitation light is not incident on the phosphor is entered, decreasing the amount of excitation light absorbed by the phosphor unit 15. According, when compared with a normal state in which, for example, the phosphor is not fallen from the light source device 10, that is, the phosphor unit 15 is not faulty, the calorific value decreases and the temperature of the emission portion 15a falls.

If the optical fiber 13 is broken or degraded, excitation light leaks from a broken portion or degraded portion, the amount of excitation light entering the phosphor unit 15 decreases, and the calorific value of the phosphor unit 15 also decreases.

Thus, when the temperature deviates from a predetermined range, the amount of excitation light leaked from the phosphor unit 15 increases and the amount of excitation light leaked from the optical fiber 13 also increases. Thus, the judgment portion 33 judges that other devices or the user could be affected. Then, the judgment portion 33 judges such a state to be abnormal, that is, "dangerous".

When the amount of leaked excitation light is less than a predetermined value, the judgment portion 33 judges such a state to be abnormality-free (normal), that is, "safe" by assuming that the leaked excitation light does not affect other devices and the user.

The predetermined value as a threshold of judgment may be determined by considering, for example, the temperature of the emission portion 15a originating from a leakage state of excitation light from the phosphor unit 15.

Next, the presence or absence of any abnormal condition of the light source device 10, more specifically, being "suitable" and "unsuitable" judged by the judgment portion 33 will be described.

The judgment portion 33 makes a judgment of "suitable" or "unsuitable" based on the amount of leaked excitation light, but in the present embodiment, a judgment is made based on the temperature, instead of the amount of leaked excitation light.

In this case, that the light source device 10 is "suitable" or the light source device 10 is "unsuitable" is determined by, for example, whether the excitation light source 11 or the phosphor unit 15 can satisfy design specifications.

In this case, the predetermined value as a threshold of judgment may be determined by considering manufacturing variations of, for example, the excitation light source 11 or the phosphor unit 15 in such a way that, for example, the excitation light source 11 or the phosphor unit 15 satisfies the design specifications. The predetermined value is smaller than the predetermined value when determining to be "safe" or "dangerous".

The predetermined value as a threshold of judgment may also be determined in such a way that in consideration of degradation of, for example, the phosphor unit 15, the light source device 10 is determined to be "suitable" if there is sufficient time before the phosphor unit 15 becomes dangerous due to degradation of the phosphor unit 15 and determined to be "unsuitable" if there is not sufficient time.

Further in the present embodiment, when, for example, the optical fiber 13 is broken or degraded, excitation light is leaked from a broken portion or degraded portion. If the amount of leaked excitation light is equal to a predetermined value or more, the excitation light may affect other devices or the user. The judgment portion 33 judges such a state to be abnormal, that is, "unsuitable".

When the amount of leaked excitation light is less than a predetermined value, the judgment portion 33 judges such a state to be abnormality-free (normal), that is, "suitable" by assuming that the leaked excitation light does not affect other devices and the user.

The predetermined value as a threshold of judgment may be determined by considering, for example, the leakage state of excitation light based on the temperature of the emission portion 15a.

Thus, in the present embodiment, the same effect as that in the first embodiment can be achieved by detecting at least one of the temperature and calorific value of the emission portion 15a of the phosphor unit 15.

Also in the present embodiment, the presence or absence of an abnormal condition of the light source device 10 can be detected more precisely by using the calorific value as a criterion without being affected by, for example, an ambient temperature in an environment where the light source device 10 is disposed and without waiting until the rise in temperature converges.

The present invention is not limited to the above embodiments and can be embodied by modifying elements without deviating from the spirit thereof in the working stage. Also, various inventions can be formed by appropriately combining a plurality of elements disclosed in the above embodiments.

What is claimed is:

1. An illumination system comprising:
   a light source device including:
   an excitation light source that emits excitation light; and
   a phosphor unit that converts the excitation light emitted from the excitation light source into fluorescence to emit the fluorescence toward an illuminated object, the phosphor unit further including an emission portion to emit the fluorescence and the excitation light; and
   a state confirming device detachably connected to the emission portion, the state confirming device confirming a state of the light source device based on the state of the phosphor unit when connected to the light source device and the phosphor unit emits the fluorescence.

2. The illumination system according to claim 1, further comprising a display which displays a message based on the state of the light source device.

3. The illumination system according to claim 1, further comprising;
   the light source includes a connection/separation detection portion that detects that the state confirming device is connected to or separated from the emission portion; and
   a control portion controls the excitation light source so that the excitation light source temporarily emits the excitation light when the connection/separation detection portion detects that the state confirming device is connected to the emission portion.

4. The illumination system according to claim 3, wherein the state confirming device includes:
   a detection portion that detects the state of the light source device based on the state of the excitation light of the phosphor unit when the connection/separation detection portion detects that the state confirming device is connected to the emission portion and the control portion controls the excitation light source so that the excitation light source temporarily emits the excitation light; and
   a judgment portion that judges whether the light source device has any abnormal condition based on a detection result of the detection portion.

5. The illumination system according to claim 4, wherein the judgment portion judges whether the light source device has the abnormal condition by judging at least one of safety of the light source device and the state appropriate for an operation of the light source device based on the detection result.

6. The illumination system according to claim 4, wherein the control portion controls the excitation light source so as to enable the excitation light source to emit the excitation light when the connection/separation detection portion detects that the state confirming device is separated from the emission portion.

7. The illumination system according to claim 4, wherein the detection portion detects at least one of an amount of light, a spectrum, and luminous intensity distribution characteristics of the excitation light emitted from the emission portion in the state in which the phosphor unit emits the fluorescence and the excitation light.

8. The illumination system according to claim 4, wherein the detection portion detects at least one of an temperature of the emission portion and a calorific value of the emission portion in the state in which the phosphor unit emits the fluorescence.

9. An illumination method having a light source device including an excitation light source that emits excitation light and a phosphor unit that converts the excitation light emitted from the excitation light source into fluorescence, the phosphor unit further including an emission portion to emit the fluorescence and the excitation light toward an illuminated object, the method comprising:
   attaching a state confirming device to the emission portion of the light source device;
   confirming a state of the light source device by the state confirming device based on the state of the phosphor unit when the state confirming device that confirms the state of the light source device is connected to the light source device and the phosphor unit emits the fluorescence; and
   illuminating the illuminated object with the fluorescence generated by the light source device based on the excitation light.

10. The illumination method according to claim 9,
   wherein the confirming controls the excitation light source so that emission of the excitation light is limited in at least one of power-on of the light source device and after operation initialization of the light source device and
   further comprising an illumination permission in which the excitation light source emits the excitation light and execution of the illuminating in which the light source device illuminates the illuminated object when the light source device has no abnormal condition based on a confirmation in the confirming.

11. The illumination method according to claim 10, wherein the confirming includes:
   detecting-connection of the state confirming device to the emission portion disposed in the phosphor unit to emit the fluorescence;
   controlling the excitation light source so that the excitation light is temporarily emitted when the connection of the state confirming device to the emission portion is detected in the detecting-connection;
   detecting the state of the light source device by the state confirming device based on the state of the phosphor unit when the phosphor unit emits the fluorescence after the excitation light being temporarily emitted by the excitation light source in the controlling; and
   judging whether the light source device has any abnormal condition by the state confirming device based on a detection result in the detecting.

12. The illumination method according to claim 11, wherein the confirming is executed before the illuminating.

13. The illumination method according to claim 11, wherein in the judging, whether the light source device has the abnormal condition is judged by judging at least one of safety of the light source device and the state appropriate for an operation of the light source device based on the detection result in the detecting.

14. The illumination method according to claim 11, wherein the illumination permission includes a separation detection in which separation of the state confirming device from the emission portion is detected and the illuminating is executed after the separation detection.

15. The illumination method according to claim 11, wherein the illumination permission includes a displaying that the illuminating is executable.

16. The illumination method according to claim 15, wherein the illumination permission includes an instruction in which an instruction to execute the illuminating is accepted after the separation detection.

17. The illumination method according to claim 11,
   wherein in the detecting, the state of the excitation light emitted from the emission portion is detected in the state in which the phosphor unit emits the fluorescence and the excitation light; and
   wherein in the judging, whether the light source device has the abnormal condition is judged based on the state of the excitation light detected in the detecting.

18. The illumination method according to claim 17, wherein the state of the excitation light is at least one of an amount of light, a spectrum, and luminous intensity distribution characteristics of the excitation light.

19. The illumination method according to claim 11,
   wherein in the detecting, a thermal state of the emission portion is detected in the state in which the phosphor unit emits the fluorescence; and
   wherein in the judging, whether the light source device has the abnormal condition is judged based on the thermal state of the emission portion detected in the detecting.

20. The illumination method according to claim 19, wherein the thermal state includes at least one of a temperature of the emission portion and a calorific value of emission portion.

21. An illumination system comprising:
   an excitation light source that emits excitation light;
   a phosphor unit that converts the excitation light emitted from the excitation light source into fluorescence to emit the fluorescence toward an illuminated object;
   a light source device including the excitation light source and the phosphor unit;
   a state confirming device that confirms a state of the light source device based on the state of the phosphor unit when connected to the light source device and the phosphor unit emits the fluorescence; and
   a control portion that controls the excitation light source so that emission of the excitation light is limited in at least one of power-on of the light source device and after operation initialization of the light source device and if the light source device has no abnormal condition based on a confirmation result of the state confirming device, controls the excitation light source so that the light source device is permitted to illuminate an illuminated object by the excitation light being emitted by the excitation light source.

* * * * *